Figure 1:
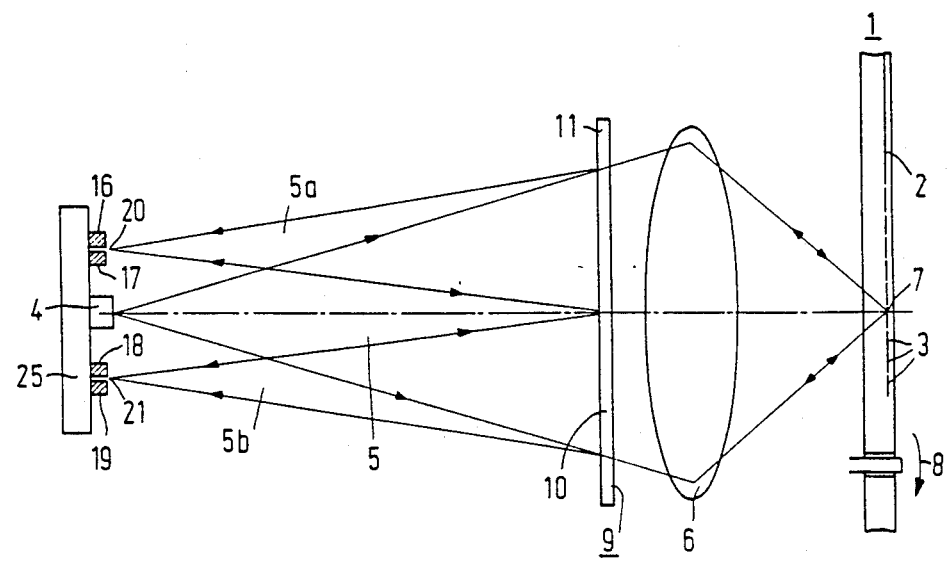

United States Patent [19]

Heemskerk

[11] Patent Number: 4,665,310

[45] Date of Patent: May 12, 1987

[54] APPARATUS FOR OPTICALLY SCANNING AN INFORMATION PLANE WHEREIN A DIFFRACTION GRATING SPLITS THE BEAM INTO TWO SUB-BEAMS

[75] Inventor: Jacobus P. J. Heemskerk, Eindhoven, Netherlands

[73] Assignee: U.S. Philips Corporation, New York, N.Y.

[21] Appl. No.: 817,190

[22] Filed: Dec. 26, 1985

[30] Foreign Application Priority Data

Oct. 17, 1985 [NL] Netherlands .......................... 8502835

[51] Int. Cl.$^4$ ............................................. G01J 1/20
[52] U.S. Cl. ....................................... 250/201; 369/45
[58] Field of Search .................. 250/201 DF, 550; 369/44, 45, 46; 354/403

[56] References Cited

U.S. PATENT DOCUMENTS 4,034,403 7/1977 Compaan et al. ...................... 369/45
4,374,323 2/1983 Winslow et al. ...................... 250/201
4,462,095 7/1984 Chen ...................................... 369/44

Primary Examiner—Davis L. Willis
Assistant Examiner—William L. Oen
Attorney, Agent, or Firm—Robert T. Mayer; Algy Tamoshunas

[57] ABSTRACT

An apparatus is described for optically scanning an information surface (2). The apparatus comprises a radiation source (4), an objective system (6) and, arranged between them, a diffraction grating (9) for separating the beam reflected by the information surface from the beam (5) emitted by the source and for splitting the reflected beam into two sub-beams (5a, 5b). For each sub-beam there is provided an associated detector pair (16, 17; 18, 19). The grating (9) comprises two sub-gratings (11 and 12) whose grating lines (13, 14) are disposed at opposite angles to the bounding line (26) of the sub-gratings.

3 Claims, 2 Drawing Figures

U.S. Patent     May 12, 1987     4,665,310

APPARATUS FOR OPTICALLY SCANNING AN INFORMATION PLANE WHEREIN A DIFFRACTION GRATING SPLITS THE BEAM INTO TWO SUB-BEAMS

The invention relates to an apparatus for optically scanning an information plane, which apparatus comprises a radiation source, an objective system for focussing the radiation beam emitted by the radiation source to form a scanning spot in the information, a diffraction grating which is arranged in the path of the beam which has been reflected by the information surface, for splitting said beam into two sub-beams, which grating comprises two sub-gratings, and a radiation-sensitive detection system comprising two detector pairs, each detector pair being associated with one sub-beam.

Such an apparatus for reading a prerecorded record carrier is known from the article "Optische Fokusfehlerdetektion" in "Neues aus der Technik", No. 6, Dec. 15, 1980, page 3. In this apparatus the diffraction grating performs two functions for which otherwise two separate elements are required. Firstly, the grating ensures that the radiation which has been reflected and modulated by the information structure is given another direction than the radiation emitted by the radiation source, so that a detection system can be arranged in the path of the modulated radiation. Secondly, the grating splits the reflected beam into two sub-beams required for generating a focus-error signal, i.e. a signal containing information about the magnitude and the direction of a deviation between the focal plane of the objective system and the information plane. Each of the sub-beams is associated with a separate detector pair, the signal representing the difference between the output signals of the detectors of the same pair being a measure of the focussing of the read beam on the information plane. If the bounding line between the two sub-gratings extends parallel to the track direction and the two detector pairs comprise four separate detectors it is possible, by determining the sum of the output signals of each detector pair and subtracting these sum signals from each other, to form a signal containing information about the magnitude and the direction of a deviation between the centre of the read spot and the central axis of the track to be read.

In order to obtain the desired beam splitting the diffraction grating in the known apparatus comprises two sub-gratings having different grating periods. As the angle through which an incident beam is diffracted by a grating is inversely proportional to the grating period, the part of the beam which is incident on one of the sub-gratings will be given another direction than the part of the beam which is incident on the other sub-grating.

The use of a diffraction grating comprising two sub-gratings having different periods has the advantage that the detectors of two detector pairs can be arranged close to one another, which simplifies manufacturing. As the efficiency of a diffraction grating, i.e. the quotient of the amount of radiation diffracted in the desired direction and the total amount of radiation depends inter alia on the grating period, the sub-beams formed by the composite grating may have different intensities, which leads to an erroneous tracking-error signal.

If, as proposed in said article, the bounding line between the detectors of one pair extends parallel to the grating lines and these lines in turn extend parallel to the bounding line between the two sub-gratings, this will give rise to a deviation, also referred to as "off-set" in the focussing error signal when the wavelength of the read beam varies. This is caused by the fact that in the case of a wavelength variation the angle through which the sub-beams are diffracted and consequently the positions of the radiation spots formed by the sub-beams in the detection plane will vary with respect to the detectors associated with said sub-beams, namely in the same direction as that of the displacement of the spots in the case of a focussing error. In the above arrangement also curvature of the image field may arise.

It is the object of the present invention to provide an optical scanning apparatus in which the diffraction grating is constructed in such a way and the detectors are arranged in such a way that the disadvantages of the above constructions are overcome, whilst the advantages are maintained. According to the invention the apparatus is characterized in that the sub-gratings have the same grating period and the grating lines of the first sub-grating extend at a first angle and the grating lines of the second sub-grating extend at a second angle, which is equal but opposite to the first angle, to the bounding line of the two sub-gratings and in that for each detector pair the bounding line between the detectors extends transversely of the direction of the grating lines of the associated sub-grating.

Suitably, the detectors of this apparatus are photo-diodes. An apparatus comprising photo-diodes may be characterized further in that these photo-diodes are integrated on a single substrate.

In accordance with a further characteristic feature of the apparatus, in which the radiation source is a diode laser, the diode laser and the photo-diodes are integrated on a single substrate.

Embodiments of the invention will now be described in more detail, by way of example, with reference to the accompanying drawing, in which:

FIG. 1 schematically shows a read apparatus embodying the invention, and

Figure 2:
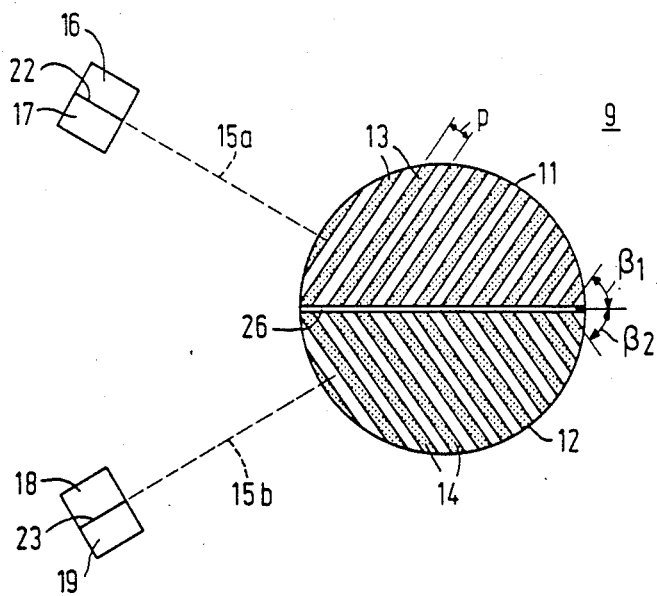

FIG. 2 shows the composite diffraction grating used in said apparatus and schematically illustrates the orientation of the detectors relative to this grating.

FIG. 1 is a radial cross-sectional view of a small part of an optical record carrier 1 having a radiation-reflecting information plane. The tracks 3 situated in the information plane extend transversely of the plane of drawing of FIG. 1. The information surface is scanned by a beam 5 emitted by a radiation source 4, for example a diode laser. This beam is focussed by an objective system 6, schematically represented by a single lens, to form a tiny radiation spot 7 in the information plane. As the record carrier is rotated about an axis 8 a track 3 is scanned and the read beam is modulated by the information contained in this track. By moving the record carrier and the read unit, comprising the source 4 and the objective system 6, in a radial direction relative to one another the entire information surface is scanned.

The beam which has been reflected and modulated by the information surface should be detected, which means that this beam should be separated from the projected beam. Therefore, the apparatus should comprise a beam-separating element.

For reading an information structure with minute information details, for example of the order of 1 μm, an objective system having a large numerical aperture is required. The depth of focus of such an objective system is small. Since variations in the distance between the information plane 2 and the objective system 6 may occur which are larger than the depth of focus, steps have to be taken in order to detect these variations and, in response thereto, correct the focussing. To this end the apparatus may be provided with a beam splitter which splits the reflected beam into two sub-beams, and with, for example, four detectors arranged in line, of which a first pair of detectors cooperates with the first sub-beam and a second pair cooperates with the second sub-beam. The output signals of the detectors are processed to form inter alia a focus-servo signal.

As described in the article "optische Fokusfehlerdetection" in "Neues aus der Technik", no. 6, Dec. 15, 1980, page 3, beam separation and beam splitting can be effected by means of a single element, namely a transparent grating. This grating splits an incident beam into a non-diffracted zero-order beam, and a plurality of diffracted first-order and higher-order beams. The grating parameters, specifically the grating period, the depth of the grating grooves and the shape of the grating grooves may be selected in such a way that most of the incident radiation is diffracted in one of the first-order beams. Since the grating is divided into two sub-gratings of which one of the grating parameters differs for each of the two sub-gratings, the first-order beams formed by the sub-gratings have different orientations, in other words beam-splitting is obtained.

In accordance with the invention the grating 9 comprises two sub-gratings 10 and 11 having the same grating period but whose grating strips 13 and 14 respectively extend at aopposite angles $\beta_1$ and $\beta_2$ respectively to the bounding line 26 between the sub-gratings 10 and 11. In FIG. 2 this grating is shown in front view. Because of the different orientations of the grating strips 13 and 14 the sub-beams 5a and 5b in FIG. 1 are diffracted in different directions. In FIG. 2 these directions are represented schematically by the broken lines 15a and 15b.

In the path of the sub-beams 5a and 5b two radiation-sensitive detectors 16, 17 and 18,19 respectively are arranged in such a way that in the case of a correct focussing of the beam 5 on the information surface 2 the radiation spots 20 and 21 formed by the sub-beams 5a and 5b are situated symmetrically relative to the detectors 16, 17 and 18, 19 respectively. When a focussing error occurs the energy distribution within the sub-beams 5a and 5b relative to the associated detectors will vary, which may also be regarded as a displacement of the sub-beams and consequently of the radiation spots 21 and 20 relative to the detectors. If in the arrangement shown in FIG. 1 the focus of the beam 1 is situated to the left of the information plane 2, the radiation spots 20 and 21 will be offset towards the optical axis and the detectors 17 and 18 will receive more radiation than the detectors 16 and 19. If the focus of the beam 5 is situated to the right of the information plane the reverse may happen and the detector 16 and 19 will receive more radiation than the detectors 17 and 18. If the output signals of the detectors 16, 17, 18 and 19 represented by $S_{16}$, $S_{17}$, $S_{18}$ and $S_{19}$ respectively, the focus-servo signal $S_f$ will be given by:

$$S_f = (S_{16} + S_{19}) - (S_{17} + S_{18}).$$

A signal which is proportional to the information being read, or the information $S_i$ is given by:

$$S_i = S_{16} + S_{17} + S_{18} + S_{19}$$

If, as is illustrated in FIG. 1, the bounding line 26 of the two sub-gratings 10 and 11 extends parallel to the direction of a track 3 being read, it is also possible to generate a tracking cross signal $S_r$ by means of the same detectors. This signal is given by:

$$S_r = (S_{16} + S_{17}) - (S_{18} + S_{19}).$$

In comparison with known apparatuses an apparatus comprising a grating as shown in FIG. 2 has the advantage that it is possible to avoid a number of undesired effects which may occur during use of sub-gratings with different grating periods, such as
(a) different diffraction efficiencies of the sub-gratings,
(b) focussing of the sub-beams in different planes, i.e. curvature of the image field.

Moreover, because the bounding line 22 between the detectors 16 and 17 and the bounding line 23 between the detectors 18 and 19 extends transversely of the grating strips 13 and 14 respectively, as is shown schematically in FIG. 2, a variation of the diffraction angle of the gratings caused by a variation in wavelength of the beam 5 will not give rise to an offset of the focus-servo signal, because this variation merely gives rise to a displacement of the radiation spot 20 or 21 along the respective bounding line 22 or 23. Finally, the detector pairs 16, 17 and 18, 19 can be arranged close to one another, so that these four detectors can be integrated on a single substrate. If the radiation source is a diode laser this laser can be formed on the same substrate 25, as is shown in FIG. 1.

If the detectors need not be used for generating a tracking signal the two detectors 17 and 18 may be replaced by one central detector. The first detector pair is then constituted by the detector 16 and the central detector and the second detector pair by the central detector and the detector 19. If the output signal of the central detector is $S_c$, the focus-servo signal will be:

$$S_f = (S_{16} + S_{19}) - S_c$$

and the information signal will be:

$$S_i = S_{16} + S_{19} + S_c$$

The invention has been described for use in a read apparatus but it may alternatively be utilised in a write apparatus or in a combined write-read apparatus in which during recording the focussing and the tracking of the write beam are monitored. The focus-error detection system described here does not utilize special properties of the information surface 2. It is merely necessary and adequate that this surface is reflecting. Therefore, the invention may be used in various apparatuses where a very accurate focussing is required, for example in microscopes, in which case the tracking-error detection may be dispensed with.

What is claimed is:

1. An apparatus for optically scanning an information plane, which apparatus comprises a radiation source, an objective system for focussing the radiation beam emitted by the radiation source to form a scanning spot in the information, a diffraction grating which is arranged in the path of the beam which has been reflected by the information surface, for splitting said beam into two sub-beams which grating comprises two sub-gratings and a radiation-sensitive detection system comprising two detector pairs, each detector pair being associated with one sub-beam, characterized in that the sub-gratings have the same grating period and the grating lines of the first sub-grating extent at a first angle and the grating lines of the second sub-grating extent at a second angle, which is equal but opposite to the first angle, to the bounding line of the two sub-gratings and in that for each detector pair the bounding line between the detectors extends transversely of the direction of the grating lines of the associated sub-grating.

2. An apparatus as claimed in claim 1, in which the detectors are photo diodes, characterized in that the photo-diodes are integrated on a single substrate.

3. An apparatus as claimed in claim 2, in which the radiation source is a diode laser, characterized in that the diode laser and the photo-diodes are integrated on a single substrate.

* * * * *

UNITED STATES PATENT AND TRADEMARK OFFICE
CERTIFICATE OF CORRECTION

PATENT NO.    : 4,665,310
DATED         : May 12, 1987
INVENTOR(S)   : Jacobus P.J. Heemskerk It is certified that error appears in the above-identified patent and that said Letters Patent is hereby corrected as shown below:

<u>IN THE CLAIMS</u>

Claim 1, line 3    delete "the" insert --a-- line 5    after "information" insert --plane,-- line 6    delete "by" insert --from-- line 7    delete "surface," insert --plane,-- line 7    after "said" insert --reflected-- line 8    after "beams" insert --,-- line 8    after "gratings" insert --,-- line 13    delete "the first" insert --one-- line 13    delete "extent" insert --extend--

UNITED STATES PATENT AND TRADEMARK OFFICE
CERTIFICATE OF CORRECTION

PATENT NO. : 4,665,310

DATED : May 12, 1987

INVENTOR(S) : Jacobus P.J. Heemskert

It is certified that error appears in the above-identified patent and that said Letters Patent is hereby corrected as shown below:

IN THE CLAIMS

Claim 1, line 14    delete "extent" insert --extend-- line 15    after "which" insert --second angle--

Signed and Sealed this

Twenty-ninth Day of November, 1988

Attest:

DONALD J. QUIGG

*Attesting Officer*     *Commissioner of Patents and Trademarks*